United States Patent
Vela

(10) Patent No.: US 6,684,555 B1
(45) Date of Patent: Feb. 3, 2004

(54) HOOK SETTING FISHING POLE HOLDER

(76) Inventor: Jose A. Vela, 110 N. Stanton, Johnson, KS (US) 67855

( * ) Notice: Subject to any disclaimer, the term of this patent is extended or adjusted under 35 U.S.C. 154(b) by 0 days.

(21) Appl. No.: 10/267,344

(22) Filed: Oct. 9, 2002

(51) Int. Cl.[7] .............................................. A01K 97/12
(52) U.S. Cl. ........................................................ 43/15
(58) Field of Search ................................ 43/15, 16, 17

(56) References Cited

U.S. PATENT DOCUMENTS

| | | | |
|---|---|---|---|
| 693,071 A | | 2/1902 | Ruud |
| 2,783,575 A | | 3/1957 | Housel, Sr. |
| 2,795,072 A | * | 6/1957 | Porter ............................ 43/16 |
| 2,821,041 A | | 1/1958 | Hughes |
| 3,284,943 A | | 11/1966 | Wedel |
| 3,412,499 A | | 11/1968 | Pastrovich, Sr. |
| 3,879,880 A | * | 4/1975 | Bailey ............................ 43/17 |
| 3,881,269 A | | 5/1975 | Timmons |
| 4,077,148 A | * | 3/1978 | Carey ............................ 43/16 |
| 4,188,742 A | | 2/1980 | Oulman |
| 4,213,264 A | * | 7/1980 | Robinson, Jr. ................. 43/16 |
| 4,219,955 A | | 9/1980 | Lo Bosco |
| 4,443,963 A | * | 4/1984 | Braaten ....................... 43/21.2 |
| 4,471,553 A | * | 9/1984 | Copeland ....................... 43/15 |
| 4,676,018 A | | 6/1987 | Kimball |
| 4,823,493 A | * | 4/1989 | Gray ............................. 43/15 |
| 4,920,681 A | | 5/1990 | Toliver, Jr. et al. |
| 4,964,233 A | * | 10/1990 | Benson et al. ................. 43/17 |
| 5,050,332 A | | 9/1991 | Cross |
| 5,245,778 A | * | 9/1993 | Gallegos et al. ............... 43/15 |
| 5,359,802 A | * | 11/1994 | Gutierrez ....................... 43/16 |
| 5,570,534 A | * | 11/1996 | Ford ........................... 43/19.2 |
| 6,088,946 A | * | 7/2000 | Simmons ....................... 43/15 |
| 6,301,820 B1 | | 10/2001 | Rosa |

* cited by examiner

Primary Examiner—Charles T. Jordan
Assistant Examiner—Jordan Lofdahl
(74) Attorney, Agent, or Firm—Kenneth H. Jack; Davis & Jack, L.L.C.

(57) ABSTRACT

A hook setting fishing pole holder including a base having a forward end and having a hollow storage space; a fishing pole holding sleeve fixedly and hingedly attached to the base; a pair of extension springs spanning between the fishing pole holding sleeve and the base; a trip latch assembly oppositely spanning between the fishing pole holding sleeve and the base, the trip latch assembly being responsive to a forward pull upon a fishing pole held by the fishing pole holding sleeve to release the fishing pole holding sleeve for rearward sweeping of the fishing pole; a first ground staple, and apertures within the base adapted for receiving the ground staple for anchoring the base to the ground.

15 Claims, 2 Drawing Sheets

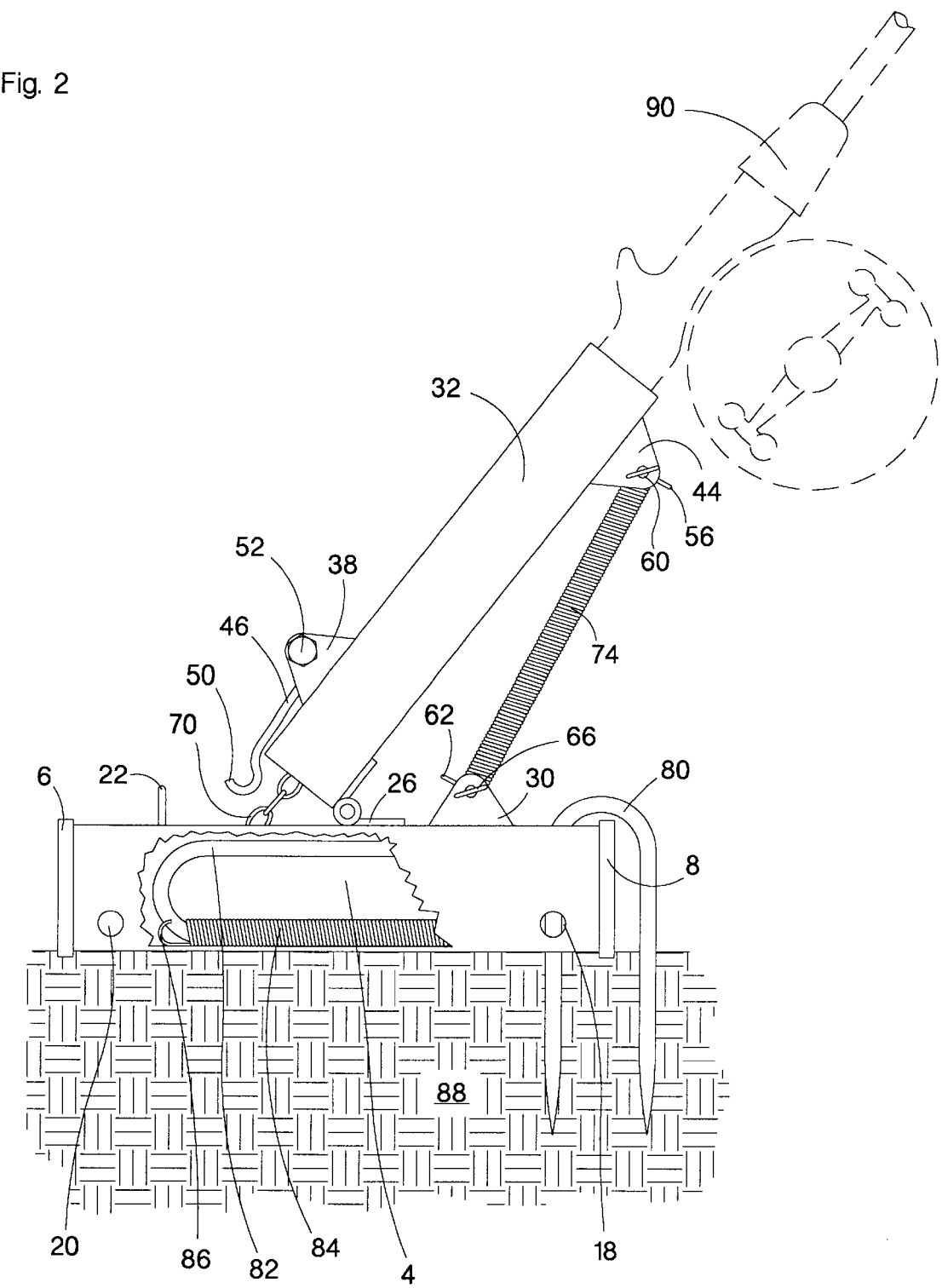

HOOK SETTING FISHING POLE HOLDER

FIELD OF THE INVENTION

This invention relates to fishing equipment and apparatus. More particularly, this invention relates to holders and brackets adapted for holding fishing poles while fishing, for detecting a strike, and for automatically rearwardly sweeping the fishing pole for fish hook setting.

BACKGROUND OF THE INVENTION

Bank or shoreline fisherman are known to advantageously utilize automatic fish hook setting fishing pole holders. Such apparatus allow a bank or shore fisherman to fish with a single fishing pole and line without devoting constant attention to the fishing pole and line. Alternately, use of automatic hook setting fishing pole holders allows a bank or shore fisherman to fish with multiple poles, dividing the fisherman's attention among several poles.

Accessory parts associated with bank or shore utilization of automatic hook setting fish pole holders comprise variable force springs and ground stakes. Such accessory parts tend to become lost or misplaced, rendering the automatic fish hook setting fishing pole holder substantially non-functional. The instant inventive hook setting fishing pole holder solves or ameliorates the above problems or deficiencies of common hook setting fishing pole holders by providing such apparatus having a base, the base having a hollow interior space adapted for receiving and storing accessory parts associated with the utilization of the hook setting fishing pole holder for bank or shore fishing.

BRIEF SUMMARY OF THE INVENTION

A primary structural component of the instant inventive hook setting fishing pole holder comprises a base having a hollow interior storage space. Preferably, the base is fabricated from a one foot long to fourteen inches long length of one and one-half inch to two inch steel square tubing; the hollow interior bore of such length of square tubing serving as the hollow storage space. Suitably, the base may alternately comprise plastic or wood having walls defining the hollow interior storage space. Preferably, opposing ends of the preferred steel square tubing base are closed and are covered by removable plastic end caps. Suitably, the tube end closing means may comprise rubber or plastic plugs, slide panels or hinged panels. Also suitably, one end of the square tubing base may be permanently closed by a welded panel of steel, the opposite end of the base being closed by one of the removable closing means discussed above.

The base necessarily integrally comprises ground staking means adapted for receiving at least a first ground stake. Preferably, the ground staking means comprises stake receiving apertures extending through upper and lower walls of the base, the staking means being situated at the rearward end of the base. Suitably, the base staking means may alternately comprise stake receiving eyes extending laterally from a side wall of the base.

The instant inventive hook setting fishing pole holder necessarily further comprises at least a first ground stake, and preferably two ground stakes, each preferably configured as a "U" shaped ground staple. In use of the instant inventive hook setting fishing pole holder, the base is placed on the ground at lakeside with its forward end extending toward the lake. A forward leg of the preferred ground staple is then extended downwardly through the base's rear stake receiving aperture. Thereafter, the ground staple is percussively driven downwardly into the ground, anchoring the base to the ground. Such configuration allows the base to pivot leftwardly and rightwardly about the forward leg of the ground staple, while being securely anchored by the ground staple. Upon proper alignment of the base in accordance with wind drift and line angle, the preferred second ground staple may be driven through forward ground staking apertures for further securing the base upon the ground. Necessarily, the hollow storage space of the base is fitted for receipt and storage of the preferred pair of ground staples.

The instant inventive hook setting fishing pole holder necessarily further comprises fishing pole holding means fixedly attached to the base, such means preferably extending upwardly from upper surface of the base. A primary structural component of the fishing pole holding means preferably comprises a five to six inch length of steel one inch square tubing which serves as a fishing pole handle receiving sleeve. Alternately, a fishing pole handle receiving bracket or frame may be suitably substituted for the preferred handle receiving square tubing sleeve.

The fishing pole holding means element of the instant invention necessarily further comprises means for automatically rearwardly sweeping a fishing pole held by the holding means in response to a forward pulling force (i.e., a fish strike) applied to such fishing pole. Preferably, such means comprises a combination of interchangeable helical extension springs spanning between the holding means and the base, and comprises a trip latch assembly oppositely spanning between the sleeve or bracket and the brace. Suitably through less desirably, a permanently mounted torsion spring may be substituted for the preferred interchangeable helical extension springs. Also suitably, spring means in the form of elastomeric straps may be substituted for metal springs. Where the instant inventive hook setting fishing pole holder comprises the preferred interchangeable helical extension springs, or comprises elastomeric straps, the base's hollow storage space is preferably further fitted for receipt and storage of such springs or straps, along with such space's receipt and storage of the preferred ground staples.

Accordingly, it is an object of the present invention to provide a hook setting fishing pole holder having a base member which functions dually for fishing pole support and for receipt and storage of accessory parts associated with use and operation of the automatic hook setting fishing pole holder upon a bank or shore of a fishing lake.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 2 is a side view of the automatic hook setting fishing pole holder of FIG. 1, the view showing the apparatus staked to the ground, the view further showing representationally a fishing pole held by the holder, the view further including a side wall "cut away" section showing an interior storage space.

DETAILED DESCRIPTION OF A PREFERRED EMBODIMENT

Figure 1:
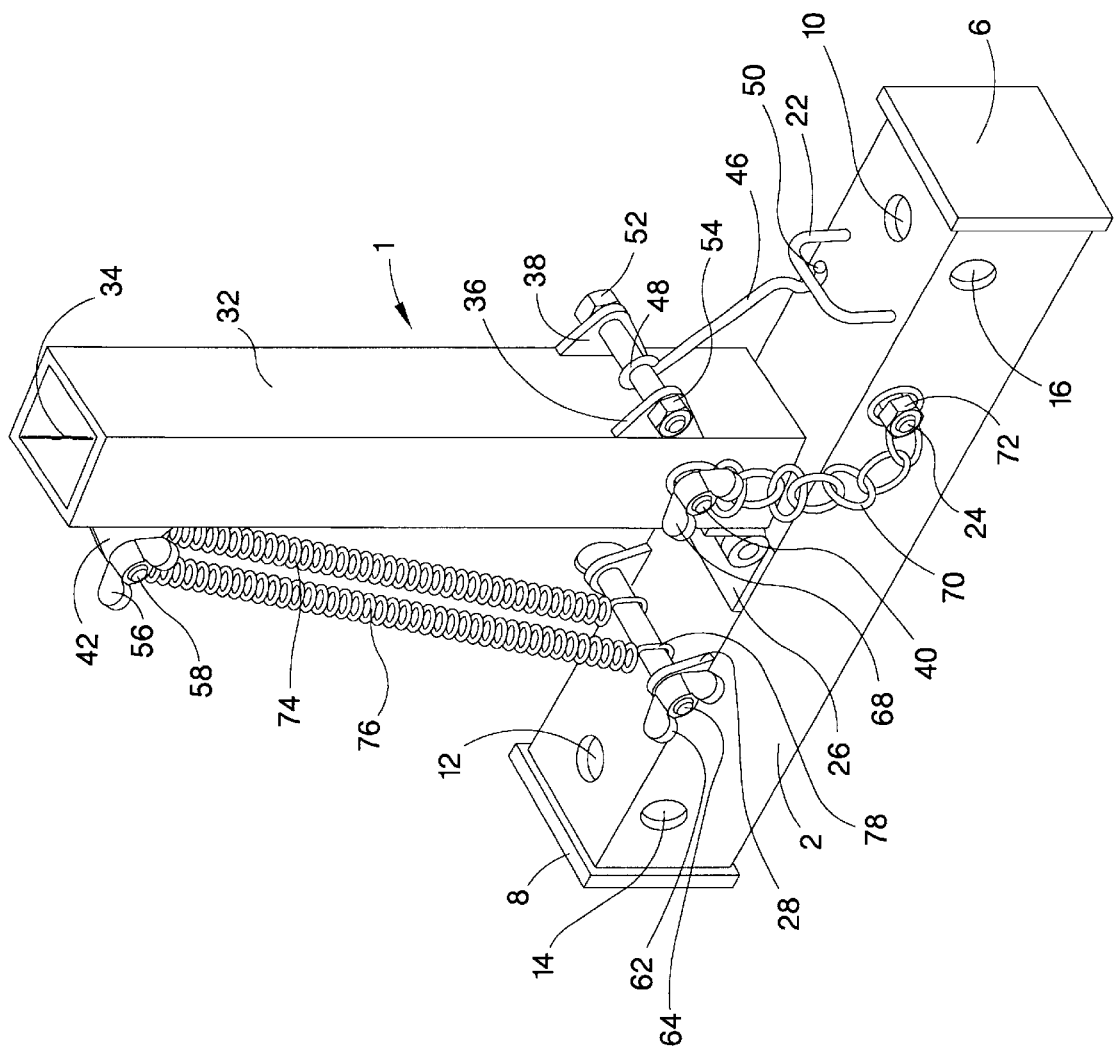
FIG. 1 is an isometric view of the instant inventive automatic hook setting fishing pole holder.

Referring now to the drawings, and in particular to FIG. 1, the instant inventive automatic hook setting fishing pole holder is referred to generally by Reference Arrow 1. Such holder 1 has a base member 2, preferably composed of a length of steel square tubing having, referring to FIG. 2, a hollow interior storage space 4. Referring simultaneously to FIGS. 1 and 2, opposite ends of the hollow interior storage space 4 are closed by closely fitted removable plastic end caps 6 and 8.

Referring further simultaneously to FIGS. 1 and 2, the forward end or trip latch assembly end of the base 2 has an upwardly and downwardly opening stake receiving aperture 10, such aperture including an immediately underlying aperture (not shown within views) extending through the floor of base 2. A second upwardly and downwardly opening stake receiving aperture 12 similarly extends vertically through the rearward end of base 2, such aperture 12 similarly including a vertically aligned underlying aperture extending through the floor of base 2. Vertical stake receiving apertures 10 and 12 facilitate staking of the automatic hook setting fishing pole holder 1 upon a bank 88 of a fishing lake or pond in a vertical orientation as depicted. Preferably, diagonal stake receiving apertures 14, 16, 18, and 22 extending through side walls of the base 2 are provided, such diagonal stake receiving apertures allowing the pole holder 1 to be staked to a ground or shore surface at an acute angle to the ground or shore. Such angled orientation of pole holder 1 allows the tip of a fishing pole 90 held by the holder 1 to remain closer to lake level, minimizing the effects of wind upon fishing line. Additional structure which is preferably fixedly welded to the base 2 comprises left and right clevis arms 30 and 28, a rear leaf of hinge 26, a helically threaded lug 24, and a trip latch loop 22.

Referring further simultaneously to FIGS. 1 and 2, the lower end of a fishing pole handle receiving square tubing sleeve 32 is fixedly welded to the forward leaf of hinge 26, such hinged attachment allowing the sleeve 32 to pivot rearwardly from the armed fishing position depicted in FIG. 1 to the back swept hook setting position depicted in FIG. 2. Additional structures which are preferably fixedly welded to sleeve 32 comprise left and right clevis arms 44 and 42, left and right clevis arms 38 and 36, and a helically threaded lug 40; such fixedly welded structures comprising means for automatically rearwardly sweeping sleeve 32.

Referring simultaneously to FIGS. 1 and 2, in order to further facilitate automatic rearward sweeping of sleeve 32, clevis pins 58, 64, and 52 respectively span across and interconnect clevis arms 44 and 42, 30 and 28, and 38 and 36. Clevis pin 52 extends through eye 48 of trip latch hook 46, clevis pin 52 preferably being fixedly and permanently mounted a cross clevis arms 36 38 by helically threaded nut 54. Clevis pin 58 similarly extends through upper spring attachment loops 78 of helical extension springs 74 and 76. Preferably, the head of clevis pin 58 is configured as a thumb turn 60, and a wing nut 56 is provided, allowing clevis pin 58 to be manually installed and removed, facilitating selective installation and removal of springs 74, 76, and 84. Clevis pin 64 similarly extends or is extendable through loops 78 or 86 of springs 74, 76, or 84. Similarly, with clevis pin 58, clevis pin 64 has a thumb turn 66 and wing nut 62 facilitating manual installation and removal.

Referring further simultaneously to FIGS. 1 and 2, a pivot stopping chain 70 is preferably provided, the base or proximal end of the pivot stopping chain 70 being fixedly and permanently attached to lug 24 by helically threaded nut 72, the opposite or distal end of chain 70 being removably attached to sleeve 32 by manually turnable wing nut 68.

Referring further simultaneously to FIGS. 1 and 2, in order to set or arm the fishing automatic hook setting fishing pole holder 1 for fishing, a forward manual pulling force is applied to the upper end of sleeve 2, rotating sleeve 32 forwardly until it assumes the configuration depicted in FIG. 1. Thereafter, hook 46 is counter-rotated about clevis pin 52 until hook end 50 engages loop 2. Thereafter, the pulling force upon sleeve 32 is released allowing hook end 50 to hold sleeve 32 in the upwardly extended set or armed position depicted in FIG. 1.

Referring to FIG. 1, upon slight clockwise rotation of sleeve 32, hook end 50 of hook 46 disengages, rotating with respect to sleeve 32 to the position depicted in FIG. 2. Instantaneously with such disengagement, springs 74 and 76 draw clevis pin 58 toward clevis pin 64, counter-pivoting sleeve 32 for fish hook setting.

Referring simultaneously to FIGS. 1 and 2, the hollow interior storage space 4 of base 2 is preferably fitted for receipt of and for storage of helical extension spring 74, helical extension spring 76, helical extension spring 84, ground staple 80, and ground staple 82. Preferably, spring 74 is a two pound spring, spring 76 is a four pound spring, and spring 84 is a six pound spring providing for, through selective interchanging of springs, application of hook setting pulling forces of two pounds, four pounds, six pounds, eight pounds, ten pounds, and twelve pounds.

In use of the instant inventive automatic hook setting fishing pole holder 1, referring simultaneously to FIGS. 1 and 2, it is assumed, for example, that fishing with six pounds of automatic hooking setting force is desired. It is also assumed that at the commencement of a day's fishing, staple 80, staple 82, spring 84, spring 74, and spring 76, wing nut and bolt assembly 56 and 58, and wing nut and bolt assembly 62 and 64 are all stored within the hollow interior space 4 of base 2. End cap 6 is removed, and all of said contents of base 2 are poured out onto the ground. Wing nut 68 is then removed from helically threaded lug 40. The distal end of chain 70 is then placed over lug 40 and wing nut 68 is then reinstalled over lug 40, securing said distal end in place. Sleeve 32 is then pivoted with respect to base 2 to the back swept orientation depicted in FIG. 2, pulling chain 70 taut. The lower loops 78 of two and four pound springs 74 and 76 are then aligned between clevis arms 30 and 28. Clevis pin 64 is then extended through said clevis arms and through the lower loops 78 of springs 74 and 76. Thereafter, thumb turn 66 is held in one hand while an operator's other hand manually turns wing nut 62, installing such nut over helically threaded end of clevis pin 64. In a similar fashion, the upper loops 78 of springs 74 and 76 are positioned between upper clevis arms 44 and 42, and clevis pin 58 is extended laterally therethrough, such pin being secured by wing nut 56. Thereafter, the spare six pound spring 84 and front staple 82 are replaced within the hollow storage space 4 of base 2, and end cap 6 is replaced over the end of base 2. Thereafter, sleeve 32 is pivoted upwardly to its armed or set position, and hook end 50 of hook 46 is rotated for engagement with loop 22. Thereafter, base 2 is placed on the ground at lakeside, and is oriented so that its forward end faces the fishing lake or pond. Thereafter, a forward leg of staple 80 is extended downwardly through aperture 12, and staple 80 is hammered into the ground 88, securing and anchoring the automatic hook setting fishing pole holder 1. Alternately, after pivoting base 4 about staple to a desired angle with respect to the lake, staple 84 may be additionally extended through front staking aperture 10, further anchoring the assembly. Thereafter, fishing pole 90 is operated to cast a baited fishing line into the lake or pond. Thereafter, the handle of fishing pole 90 is inserted downwardly in the hollow bore 34 of sleeve 32. Upon a strike by a fish, fishing pole 90 is pulled forwardly toward the lake, and such pulling force is transmitted to sleeve 32, pivoting sleeve 32 slightly toward the lake. Upon such slight forward pivoting motion of sleeve 32, hook end 50 disengages from loop 22, allowing springs 74 and 76 to sweep sleeve 32 and fishing pole 90 rearwardly, setting the hook.

Reversal of the steps outlined above configures the automatic hook setting fishing pole holder for compact storage. Preferably, upon disassembly, sleeve 32 aligns in parallel fashion with base 2, the sleeve 32 preferably nesting between clevis arms 30 and 28.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A hook setting fishing pole holder comprising:
   (a) a base having a forward end and having a substantially closed hollow storage space;
   (b) fishing pole holding means fixedly attached to the base, the fishing pole holding means comprising means for automatically rearwardly sweeping a fishing pole held by the fishing pole holding means in response to a forward pulling force applied to the fishing pole;
   (c) at least a first stake, the substantially closed hollow storage space being fitted for storing the at least first stake; and
   (d) base staking means integral with the base, the base staking means being adapted for receiving the at least first stake; the fishing pole holding means comprising a pole handle receiving sleeve, the fishing pole holding means being further hingedly attached to the base.

2. The hook setting fishing pole holder of claim 1 wherein the means for automatically rearwardly sweeping comprises spring means spanning between the pole handle receiving sleeve and the base.

3. The hook setting fishing pole holder of claim 2 wherein the means for automatically rearwardly sweeping further comprises a trip latch assembly spanning between the pole handle receiving sleeve and the base.

4. The hook setting fishing pole holder of claim 3 wherein the spring means comprises at least a first helical extension spring, the hollow storage space being further fitted for storing the at least first helical extension spring.

5. The hook setting fishing hole holder of claim 4 wherein the staking means comprises at least a first stake receiving aperture extending vertically through the base, and wherein the at least first stake comprises a staple.

6. The hook setting fishing pole holder of claim 5 wherein the spring means further comprises a second helical extension spring,
   the hollow storage space being further fitted for storing the second helical extension spring.

7. The hook setting fishing pole holder of claim 6 further comprising a second stake and a second stake receiving aperture extending diagonally through the base.

8. A hook setting fishing pole holder comprising:
   (a) a base having a forward end and having a substantially closed hollow storage space;
   (b) fishing pole holding means fixedly attached to the base, the fishing pole holding means comprising means for automatically rearwardly sweeping a fishing pole held by the fishing pole holding means in response to a forward pulling force applied to the fishing pole;
   (c) at least a first stake, the substantially closed hollow storage space being fitted for storing the at least first stake; and
   (d) base staking means integral with the base, the base staking means being adapted for receiving the at least first stake; the base and the fishing pole holding means comprising tube segments having substantially square cross-sectional shapes.

9. The hook setting fishing pole holder of claim 8 further comprising tube closing means operatively connected to the base.

10. The hook setting fishing pole holder of claim 9 wherein the tube closing means comprises a cover selected from the group consisting of end caps and end plugs.

11. The hook setting fishing pole holder of claim 10 wherein the means for automatically rearwardly sweeping comprises spring means spanning between the fishing pole holding means.

12. The hook setting fishing pole holder of claim 11 wherein the means for automatically rearwardly sweeping further comprises a trip latch assembly spanning between the fishing pole holding means and the base.

13. The hook setting fishing hole holder of claim 12 wherein the staking means comprises at least a first stake receiving aperture extending vertically through the base, and wherein the at least first stake comprises a staple.

14. The hook setting fishing pole holder of claim 13 wherein the spring means further comprises a second helical extension spring, the hollow storage space being further fitted for storing the second helical extension spring.

15. The hook setting fishing pole holder of claim 14 further comprising a second stake and a second stake receiving aperture extending diagonally through the base.

* * * * *